US011989244B2

(12) United States Patent
Bakker et al.

(10) Patent No.: US 11,989,244 B2
(45) Date of Patent: *May 21, 2024

(54) SHARED USER DRIVEN CLIPPING OF MULTIPLE WEB PAGES

(71) Applicant: Bending Spoons S.p.A., Milan (IT)

(72) Inventors: Ruben Bakker, Sursee (SE); Daniel Nicolae, Berlin (DE); Jeffrey A. Shotts, Redwood City, CA (US)

(73) Assignee: BENDING SPOONS S.p.A., Milan (IT)

(*) Notice: Subject to any disclaimer, the term of this patent is extended or adjusted under 35 U.S.C. 154(b) by 0 days.

This patent is subject to a terminal disclaimer.

(21) Appl. No.: 17/897,031

(22) Filed: Aug. 26, 2022

(65) Prior Publication Data

US 2023/0229718 A1 Jul. 20, 2023

Related U.S. Application Data

(63) Continuation of application No. 16/653,672, filed on Oct. 15, 2019, now Pat. No. 11,449,563, which is a
(Continued)

(51) Int. Cl.
*G06F 9/54* (2006.01)
*G06F 3/0482* (2013.01)
(Continued)

(52) U.S. Cl.
CPC ........ *G06F 16/9535* (2019.01); *G06F 3/0482* (2013.01); *G06F 9/543* (2013.01); *G06F 16/986* (2019.01); *G06F 40/186* (2020.01)

(58) Field of Classification Search
CPC .... G06F 16/9535; G06F 3/0482; G06F 9/543; G06F 16/986; G06F 40/186
See application file for complete search history.

(56) References Cited

U.S. PATENT DOCUMENTS 6,366,923 B1 4/2002 Lenk et al.
6,704,024 B2 3/2004 Robotham et al.
(Continued)

OTHER PUBLICATIONS

Bakker et al., Non-Final Office Action, U.S. Appl. No. 16/653,672, Aug. 4, 2020, 12 pgs.
(Continued)

*Primary Examiner* — Hien L Duong
(74) *Attorney, Agent, or Firm* — Morgan, Lewis & Bockius LLP

(57) ABSTRACT

A digital content clipping system receives an indication that a first web page has been accessed by a first user, and searches a repository of digital content clips associated with the first web page. In accordance with a determination that the repository does not include any user-generated digital content clips associated with the first web page, the system offers one or more first clipping options based on predefined clip templates, receives selection, by the first user, of one of the first clipping options, extracts a digital content clip of the first web page in accordance with the selected one of the first clipping options, and stores the digital content clip of the first web page in a first clip collection associated with the first web page.

20 Claims, 10 Drawing Sheets

Related U.S. Application Data continuation of application No. 15/841,231, filed on Dec. 13, 2017, now Pat. No. 10,444,946.

(60) Provisional application No. 62/433,295, filed on Dec. 13, 2016.

(51) Int. Cl.
*G06F 16/9535* (2019.01)
*G06F 16/958* (2019.01)
*G06F 40/186* (2020.01)

(56) References Cited

U.S. PATENT DOCUMENTS

| | | | | |
|---|---|---|---|---|
| 6,976,210 | B1* | 12/2005 | Silva | G06F 16/9577 715/255 |
| 7,103,838 | B1 | 9/2006 | Krishnamurthy et al. | |
| 7,797,635 | B1 | 9/2010 | Denise | |
| 7,836,110 | B1 | 11/2010 | Schoenbach et al. | |
| 8,020,111 | B2 | 9/2011 | Horvitz et al. | |
| 8,108,785 | B2 | 1/2012 | Matthews et al. | |
| 8,442,265 | B1 | 5/2013 | Bosworth et al. | |
| 8,666,961 | B1 | 3/2014 | Qureshi et al. | |
| 8,799,273 | B1 | 8/2014 | Chang et al. | |
| 9,098,597 | B2 | 8/2015 | Matas et al. | |
| 9,223,766 | B2 | 12/2015 | Chub et al. | |
| 10,019,153 | B2 | 7/2018 | Kroupa et al. | |
| 10,108,584 | B2 | 10/2018 | Song et al. | |
| 10,168,881 | B2* | 1/2019 | Goyal | G06F 3/04842 |
| 10,444,946 | B2 | 10/2019 | Bakker et al. | |
| 11,361,015 | B2* | 6/2022 | Yoon | G06F 16/44 |
| 11,449,563 | B2 | 9/2022 | Bakker et al. | |
| 2004/0230441 | A1 | 11/2004 | Reilly | |
| 2005/0193010 | A1 | 9/2005 | DeShan et al. | |
| 2006/0041589 | A1 | 2/2006 | Helfman et al. | |
| 2006/0075353 | A1 | 4/2006 | DeSpain et al. | |
| 2006/0274086 | A1 | 12/2006 | Forstall et al. | |
| 2006/0277460 | A1 | 12/2006 | Forstall et al. | |
| 2006/0277481 | A1 | 12/2006 | Forstall et al. | |
| 2007/0106952 | A1 | 5/2007 | Matas et al. | |
| 2007/0266011 | A1 | 11/2007 | Rohrs et al. | |
| 2007/0266022 | A1 | 11/2007 | Frumkin et al. | |
| 2007/0266342 | A1 | 11/2007 | Chang et al. | |
| 2008/0077857 | A1 | 3/2008 | Olson | |
| 2008/0168388 | A1* | 7/2008 | Decker | G06F 40/166 715/800 |
| 2008/0201650 | A1 | 8/2008 | Lemay et al. | |
| 2008/0294981 | A1 | 11/2008 | Balzano et al. | |
| 2008/0307308 | A1 | 12/2008 | Sullivan et al. | |
| 2008/0313722 | A1 | 12/2008 | Cho et al. | |
| 2009/0164883 | A1 | 6/2009 | Decker et al. | |
| 2010/0115430 | A1 | 5/2010 | Skirpa | |
| 2011/0107226 | A1* | 5/2011 | Heo | G06F 16/9535 715/736 |
| 2011/0258216 | A1 | 10/2011 | Supakkul et al. | |
| 2012/0060098 | A1 | 3/2012 | Libin et al. | |
| 2012/0079365 | A1* | 3/2012 | Yoshida | G06F 16/9574 715/234 |
| 2012/0191728 | A1 | 7/2012 | Libin et al. | |
| 2012/0233312 | A1 | 9/2012 | Ramakumar et al. | |
| 2012/0254188 | A1 | 10/2012 | Koperski et al. | |
| 2012/0323891 | A1 | 12/2012 | Jacobson et al. | |
| 2013/0080531 | A1 | 3/2013 | Yoon et al. | |
| 2013/0161381 | A1 | 6/2013 | Roundtree et al. | |
| 2013/0302005 | A1 | 11/2013 | Harwell et al. | |
| 2013/0318063 | A1* | 11/2013 | Ayzenshtat | G06F 16/951 707/707 |
| 2013/0343597 | A1 | 12/2013 | Kocks et al. | |
| 2014/0047352 | A1* | 2/2014 | Leppan | G06F 16/9562 715/764 |
| 2014/0109004 | A1 | 4/2014 | Sadhvani et al. | |
| 2014/0164371 | A1 | 6/2014 | Tesch et al. | |
| 2014/0229481 | A1 | 8/2014 | Qureshi et al. | |
| 2014/0282069 | A1 | 9/2014 | Canetti et al. | |
| 2014/0310613 | A1 | 10/2014 | Megiddo et al. | |
| 2014/0313341 | A1 | 10/2014 | Stribling | |
| 2014/0324947 | A1 | 10/2014 | McKay et al. | |
| 2014/0372865 | A1 | 12/2014 | Corob et al. | |
| 2015/0026179 | A1 | 1/2015 | Yokoyama et al. | |
| 2015/0026224 | A1 | 1/2015 | Yokoyama et al. | |
| 2015/0046827 | A1 | 2/2015 | Akselrod et al. | |
| 2015/0169744 | A1 | 6/2015 | Walkingshaw et al. | |
| 2015/0169753 | A1 | 6/2015 | Xian et al. | |
| 2016/0274771 | A1 | 9/2016 | Seong et al. | |
| 2017/0329859 | A1 | 11/2017 | Ploeg et al. | |
| 2019/0028583 | A1 | 1/2019 | Liu et al. | |

OTHER PUBLICATIONS

Bakker et al., Final Office Action, U.S. Appl. No. 16/653,672, Feb. 10, 202021, 11 pgs.
Bakker et al., Non-Final Office Action, U.S. Appl. No. 16/653,672, Sep. 27, 2021, 11 pgs.
Ploeg, Non-Final Office Action, U.S. Appl. No. 15/597,076, Mar. 19, 2019, 14 pgs.
Ploeg, Final Office Action U.S. Appl. No. 15/597,076, Nov. 14, 2019, 18 pgs.
Ploeg, Non-Final Office Action, U.S. Appl. No. 15/597,076, Aug. 5, 2020, 22 pgs.
Hien Luongvan, Final Office Action, U.S. Appl. No. 16/653,672, Feb. 10, 2021, 11 pgs.
Ploeg, Non-Final Office Action, U.S. Appl. No. 15/597,076, Apr. 7, 2021, 28 pgs.
Ploeg, Final Office Action U.S. Appl. No. 15/597,076, Sep. 21, 2021, 34 pgs.
Ploeg, Advisory Action, U.S. Appl. No. 15/597,076, Mar. 9, 2022, 5 pgs.
Bakker et al., Non-Final Office Action, U.S. Appl. No. 15/841,231, Dec. 21, 2018, 14 pgs.
Bakker et al., Notice of Allowance, U.S. Appl. No. 15/841,231, Jun. 5, 2019.

* cited by examiner

SHARED USER DRIVEN CLIPPING OF MULTIPLE WEB PAGES

RELATED APPLICATIONS

This application is a continuation of U.S. patent application Ser. No. 16/653,672, filed Oct. 15, 2019, titled "Shared User Driven Clipping of Multiple Web Pages," which is a continuation of U.S. patent application Ser. No. 15/841,231, filed Dec. 13, 2017 (now U.S. Pat. No. 10,444,946), titled "Shared User Driven Clipping of Multiple Web Pages," which claims priority to U.S. Provisional Patent Application Ser. No. 62/433,295, filed Dec. 13, 2016, titled "Shared User Driven Clipping of Multiple Web Pages," both of which are hereby incorporated by reference in their entireties.

This application is related to U.S. patent application Ser. No. 15/597,076, filed May 16, 2017, titled "Categorizing and Clipping Recently Browsed Web Pages," which is hereby incorporated by reference in its entirety.

BACKGROUND

Significant progress has been made on development of web clipping tools related to content management. However, existing web clipping solutions are insufficient in many areas, e.g., flexibility and adequacy of the clipping process. For example, a user visiting a web page with a particular content item (e.g., a news article) may be presented with a limited set of standard clipping options that may be inadequate in terms of extracting the most relevant portions of the content (e.g., the essence of the article). Similarly, a user visiting multiple web pages with similar content may be presented with limited clipping capabilities that do not leverage preferences relevant to layouts or structures of captured data.

SUMMARY

Many web clipping tools do not support separation of web browsing and clipping workflows and thereby cause content capturing issues. It is desirable to design methods and systems for enhancing web clipping processes and experiences for better flexibility and adequacy of clipped material.

In accordance with one aspect of this application, a method for digital content clipping is implemented in a computer with a processor and memory including one or programs executable by the processor. The method includes receiving an indication that a first web page has been accessed by a first user, and searching a repository of clip collections associated with respective web pages for previously obtained user-generated digital content clips associated with the first web page. In accordance with a determination that the repository of clip collections does not include any previously obtained user-generated digital content clips associated with the first web page, the method includes offering one or more first clipping options based on pre-defined clip templates, receiving selection, by the first user, of one of the first clipping options, extracting a digital content clip of the first web page in accordance with the selected one of the first clipping options, and storing the digital content clip of the first web page in a first clip collection associated with the first web page.

In accordance with another aspect of this application, a computer includes a processor and memory. The memory includes one or programs executable by the processor to perform the above-described method.

In accordance with another aspect of this application, a non-transitory computer readable storage medium stores one or more programs configured for execution by a computer. The one or more programs include instructions for implementing the above-described method.

Other embodiments and advantages may be apparent to those skilled in the art in light of the descriptions and drawings in this specification.

BRIEF DESCRIPTION OF THE DRAWINGS

Like reference numerals refer to corresponding parts throughout the drawings.

DESCRIPTION OF EMBODIMENTS

Figure 1:
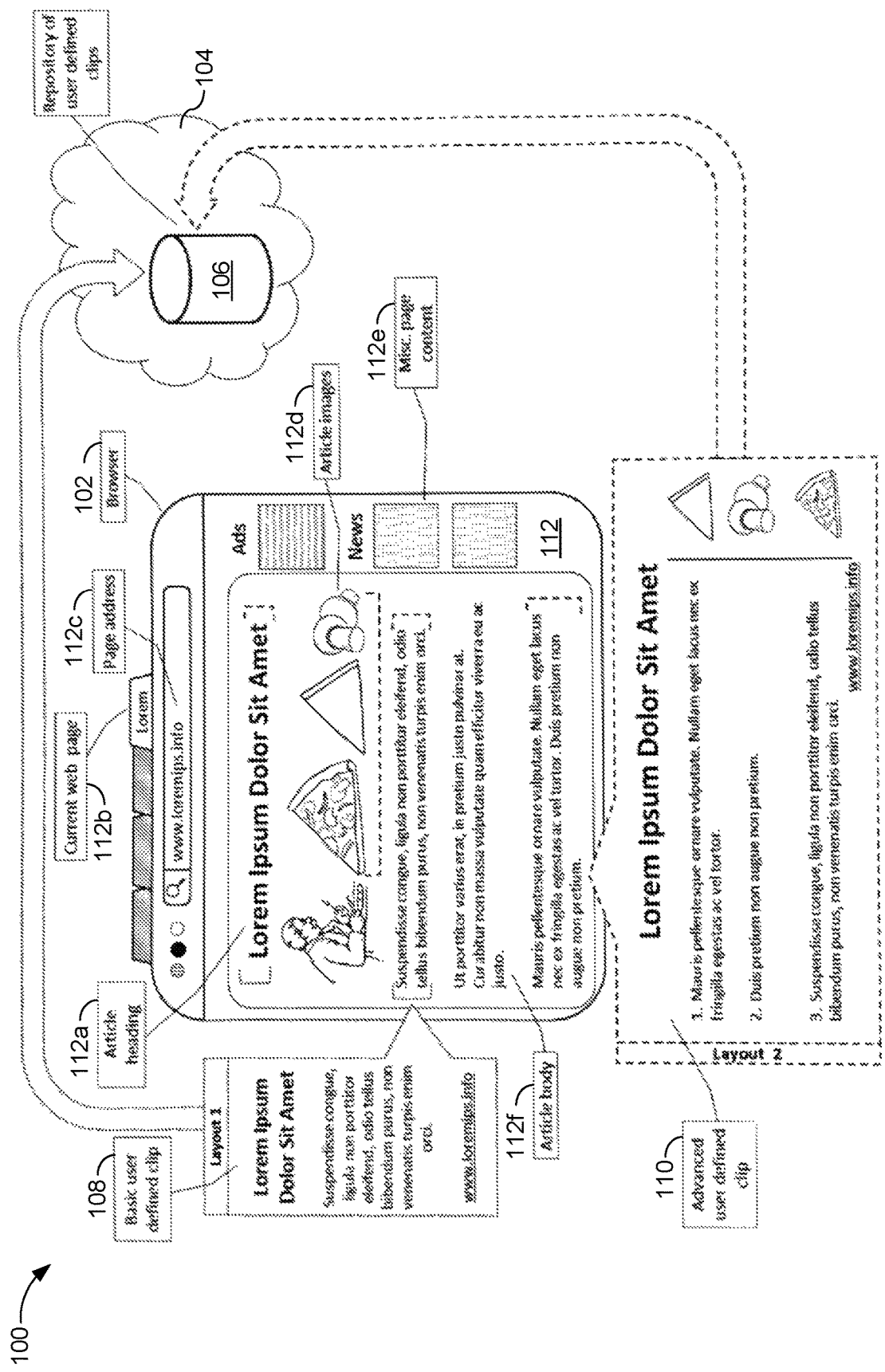
FIG. 1 is a system layout and schematic diagram of an example content clipping system including a browser application and a repository of user defined clips in accordance with some implementations.

An evolving new generation of unified content management systems, such as the Evernote cloud service and multi-platform software developed by Evernote Corporation of Redwood City, Calif., changes information processing workflow for hundreds of millions of home and office users. Some of the key features of these systems include their ability to easily collect, navigate, organize, display and edit many different types and formats of content, from web pages and typed notes to photographed and scanned images, screenshots, portions of documents and emails, audio and video clips, media and document attachments, and other content.

In the age of information overload, user productivity increasingly depends on efficient and seamless data capturing from various sources. For example, Evernote software and service show an extensive set of data capturing tools for desktop and mobile platforms, including web, email and document clipping applications and extensions, screen grabbing and markup components, page camera tool for instant optimal capturing of document photos using smartphone and tablet cameras, utilities for scanner integration, file auto-import capabilities, drag-and-drop addition of file attachments, Penultimate handwriting application and other data capturing capabilities used by dozens of millions of users. Additionally, integrated third party applications on the Evernote platform, such as IFTTT, FileThis, EverClip 2 and many more software titles and services are facilitating data capturing into Evernote. Integration of Evernote with Outlook.com allows users to save Outlook emails directly into Evernote notebooks. Similar data capturing capabilities are being developed within other content and note management systems, such as Microsoft OneNote, Apple Notes, Google Keep, Simplenote, Quip, and other systems.

Web clips constitute a major portion of captured content in contemporary content management systems. Custom user projects in the office and at home, such as educational, scientific, industrial, market research, travel, home improvement, shopping and other designs in various knowledge domains often start with web research, which typically includes searching, surfing, comprehending, selective clipping, organizing and summarizing multiple web pages. Advanced web clipping solutions, such as the Evernote Web Clipper, offer a broad range of clipping and organizational options. This includes clipping a full page, a summary snippet of a page (a bookmark), a bare bone web address, an article or other principal content automatically extracted from the page using special web technologies, a simplified article formatted for easy reading, a user selection from the page, a screenshot of the page, etc. Additionally, preferred notebook(s) and/or tag(s) may be suggested for filing and labeling a clip. A user may also be able to add a brief instant remark. Related content items from existing content collections may be displayed side-by-side with new clips reminding the user of past research on a similar subject.

In accordance with various implementations of this application, a computer system performs a content clipping method that includes: providing flexible clipping options with various standard and custom layouts, accumulating and categorizing clips captured by multiple users from a single web page, compiling a "crowdsourced" repository of clips, offering new users previously taken clips and allowing users to carry clips beyond the original page and use them for clipping not only the original page but also adapting them for clipping analogous pages. In some implementations, the system also identifies users' clipping styles and uses them for recommending subsets of previously accumulated clips from web page repositories, where the previously accumulated clips in each subset reflect the users' clipping styles.

FIG. 1 is a system layout and schematic diagram of an example content clipping system 100 including a browser application 102 (also called a web browser) and a content management application 104 (also called a content management system) in accordance with some implementations. The system 100 interacts with a web browser 102 (e.g., Chrome, Firefox, Safari, or other browser employed by a user) and a content management system 104 (e.g., Evernote), where new clips may be filed and previously filed clips may be stored, searched, organized and processed. The system 100 also interacts with a cloud-based repository 106 of past custom user clips from various web pages accumulated, processed, stored and/or categorized by page type (e.g. food, politics, news, shopping, etc.); sets of clips or clipping patterns chosen from the repository by particular users; and user specific clipping styles represented by sets of characteristics and attributes and created based on users' past clipping behaviors.

In some implementations, the content clipping system 100 performs the following functions or a subset thereof:

1. Clipping a New Web Page

When a user opens a new web page 112 that has not been processed previously by other users of the system (e.g., the repository 106 does not include any previously obtained user-generated clips associated with the new web page 112), the system 104 offers (also referred to as "recommends" and "causes to be displayed") the user one or more standard clipping options 108 (also referred to as basic clipping options), including various arrangements of digital content 112a-f of the web page 112. Examples of standard clipping options 108 include a clip of the full web page, a summary snippet of the web page, a bookmark, a web address, an article or other principal content automatically extracted from the web page, a simplified article formatted for easy reading, a user selection from the web page, and/or a screenshot of the web page in image or PDF format. Additionally or alternatively, the system 104 offers the user one or more advanced clips 110 (also referred to as user defined clips), including editable page layouts with uncompleted parameters or fields for the user to select, organize, or otherwise complete. In some implementations, uncompleted parameters include space in the clip for adding graphical or textual portions 112a, 112d-f of the web page, or space in the clip for adding user-generated notes (also referred to as comments and remarks). The advanced clips 110 allow the user to organize multiple portions 112a-f of the web page, with or without user remarks. Additionally or alternatively, the system 104 offers the user one or more other types of clips which include digital content from the web page.

The user selects a clipping option, and the system 104 captures a digital content clip corresponding to the user's selection. In some implementations, the system 104 stores the clip and/or its layout in a crowdsourced repository 106 of web clips associated with the web page from which the clip was taken. Throughout this disclosure, repositories are also referred to as clip collections, or alternatively referred to as including a plurality of clip collections, with each clip collection corresponding to a respective web page or web page category and including web clips that correspond to a respective web page or web page category. In some implementations, the system 100 first obtains the user's permission before storing the clip, any user-defined portions of the clip, or any user remarks added to the clip. In some implementations, the system 104 stores the actual clip (possibly stripped of user-generated content such as comments). In some implementations, the system 104 stores the clip's generic layout, such as "Title, First Paragraph, Another Paragraph, Image XXX" (e.g., an assumption may be that the URL is always saved with a clip and doesn't need inclusion in the layout description). In some implementations, certain portions of the captured clip are filled with excerpts of page content. For example, the user may re-arrange the content of a food recipe page so that it starts with a list of ingredients in an alphabetical order, followed by a final serving step for the ready meal, and then step-by-step cooking instructions, each supplied with an image if it exists on the page, no matter whether this layout was present on the page. For example, while a basic clip 108 automatically includes the first paragraph of article body 112f, an advanced clip 110 provides options for the user to fill in content 112a-f. In the example illustrated in FIG. 1, advanced clip 110 includes a numbered list of content from the first and third paragraphs of article body 112f, as well as images 112d in a customized layout (e.g., in a different location and order than presented on the web page 112).

In some implementations, the system 104 keeps track of the user's page clips, and when the user collects enough page clips (e.g., satisfies a threshold amount of collected page clips), the system 104 tracks the user's clipping behavior and generates the user's clipping style (also referred to as the user's clipping profile) based on the statistics of the clipped content stored in the repository 106. For example, the user's clipping style may be characterized as "concise" (e.g., clips include small portions of pages), "standardized" (e.g., clips use standard options offered by the clipping application), "multi-fragment" (e.g., clips combine several disparate content fragments of respective clipped pages), and so forth. User styles may be used for recommending crowdsourced clips from the repository 106 for subsequent users who access the web page 112, as further discussed below.

2. Accumulating and Utilizing Web Clips

Figure 2:
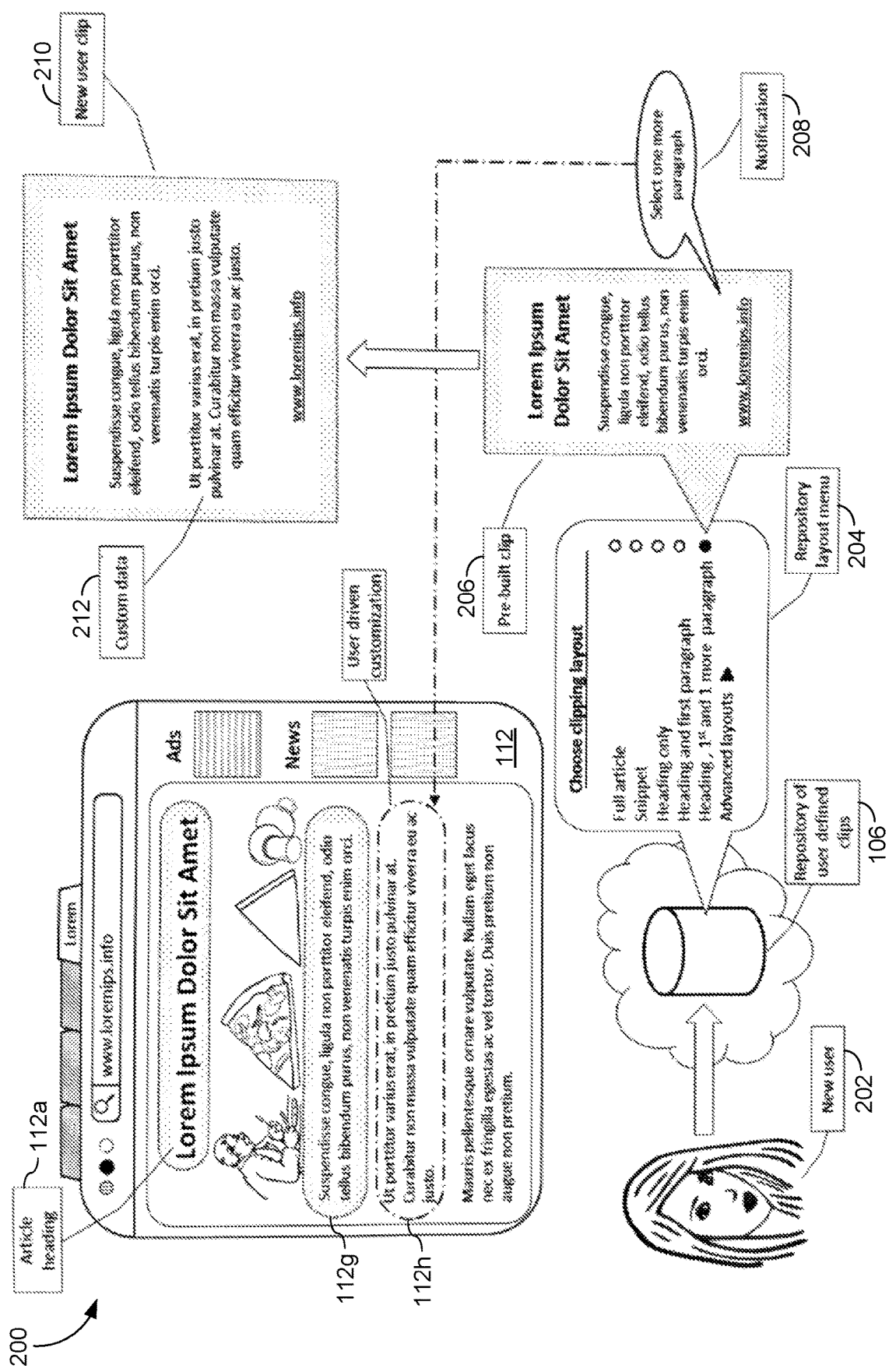
FIG. 2 is a schematic diagram of an example content clipping system for directing a new user's clipping process with crowdsourced clips in accordance with some implementations.

FIG. 2 is a schematic diagram of an example content clipping system for directing a new user's clipping process with crowdsourced clips from previous users in accordance with some implementations. After one or more users have clipped content from a web page 112, their clipping patterns (e.g., full clips with actual page excerpts included and/or user defined clipping layouts) are stored in a repository 106 associated with the web page 112, optionally subject to user permission and approval as discussed above. In some implementations, clips are categorized by various parameters, such as size, layout complexity, additional data supplied by the user, and so forth. A new user 202 accessing a web page 112 with such a repository (e.g., the repository 106 includes at least one previously obtained user-generated clip associated with the web page 112) may utilize this crowdsourced system store in a variety of ways. For example, the system 200 processes user clipping styles of clips stored in the repository 106 and associated with the web page 112 to generate recommendations regarding preferred clips (e.g., clipping options that have been selected by other users) for the web page 112. Alternatively, the system 200 lists available clips by categories, allowing the new user 202 to browse and choose clips by category. Standard clipping options explained above are also added to the set of available clips.

In some implementations, the system 200 displays a menu 204 of the available clips, from which a user (e.g., new user 202) selects a desired clip. As an example, the user 202 selects a clip 206 from the menu 204. Clip 206 automatically includes the heading 112*a* and the first paragraph 112*g* of the web page 112. Clip 206 also includes an incomplete field for additional content (e.g., displayed in the menu 204 as "1 more paragraph"). In some implementations, the clip 206 initially includes the automatically added content (e.g., the heading 112*a* and the first paragraph 112*g*), and subsequently includes the user-added content (e.g., second paragraph 112*h*) upon being selected by the user. In some implementations, a notification 208 informs the user that additional customization is required before the clip can be saved. After the user selects the custom content 212 (e.g., second paragraph 112*h*), the clip (referred to as clip 210) displays both the automatic content and the custom content 214.

In some implementations, the clipping process proceeds under various scenarios, depending on the type of clip chosen by the user. If the user has chosen a standard or a completed custom clip where all clipped content has been defined, the clip is captured and saved immediately. However, if the clip is not completed (e.g., a clipping template with custom parameters that have not been completed), the system 200 requests that the user fill in the corresponding portions of the clip (e.g., using a notification 208). For example, for a "Title, First Paragraph, Another Paragraph, Image XXX" clipping template, the system 200 clips the title and the first paragraph of the web page and prompts the user to select another paragraph and an image from the editable layout of the page content to complete the clip.

3. Adapting Shared Clips to Similar Web Pages

Figure 3:
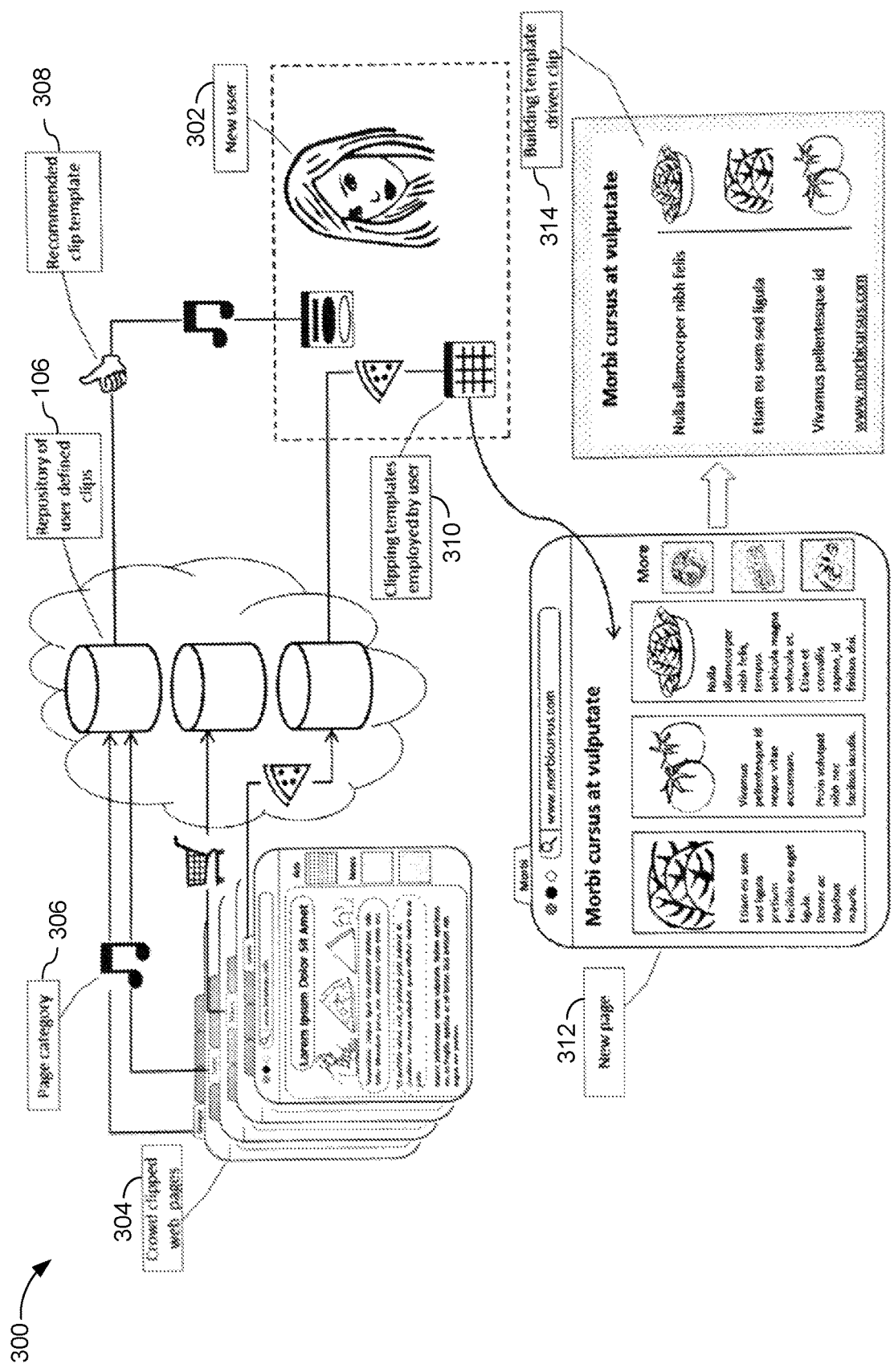
FIG. 3 is a schematic diagram of an example content clipping system for adapting previously chosen user defined clips to different but similar web pages in accordance with some implementations.

FIG. 3 is a schematic diagram of an example content clipping system for adapting previously chosen user defined clips to different but similar web pages in accordance with some implementations. In many cases, users clip similar web pages and may benefit from unified clipping formats. For example, if a user 302 browses multiple food/cooking/recipe pages 304 and has chosen a convenient clipping format 310 either from crowdsourced clip repositories 106 associated with one of the pages or by creating a user defined clipping template (e.g., from a recommended clip template 308), the user may wish to apply such clips to other pages 312 belonging to similar categories 306 in order to build a template driven clip 314. For example, layouts 110 (FIGS. 1) and 314 (FIG. 3) are based on similar templates (e.g., a list of ingredients or steps on the left, and a list of images on the right), even though the content used to fill in the templates is different (e.g., due to the source web pages being different and, as a result, including different content).

In some situations, a new web page 312 belongs to a different web site and does not follow the layout for which the desired clip has been originally created. For example, if a clipping template 310 which was adapted from similar food pages (e.g., page 112, see FIGS. 1-2), the template may automatically search for the first two paragraphs to incorporate, as illustrated by clip 210 (FIG. 2). When the user 302 accesses the new web page 312, the system 300 determines that the page 312 belongs to the food category, and based on that determination, recommends clipping template 310. However, unlike page 112, new page 312 does not have a list of paragraphs that can easily be used to fill in the clipping template.

In some implementations, in order to adapt the recommended and/or selected clip 310 (e.g., clip with content, or clipping layout) to the new page 312, the system 300 uses machine learning and advanced data processing to analyze the new page content. Examples of such data processing include name recognition (e.g., to identify ingredients in a recipe and group them in a needed portion of the template), layout recognition (e.g., to identify cooking steps that may be located in a different portion of the page and group them in a needed portion of the template), and so forth. In some implementations, if the system cannot complete the adaptation task, the system requests additional input from the user for help in choosing between various options identified by the system or for help in identifying portions of the template manually (e.g., in the event the system cannot automatically locate the ingredients, the user manually selects the portion of the web page that includes the ingredients). In some implementations, the system users the user's manual selections to refine the adaptation task by adding the user's finished clipping template to a repository of clipping templates associated with the particular category of web pages.

Figure 4:
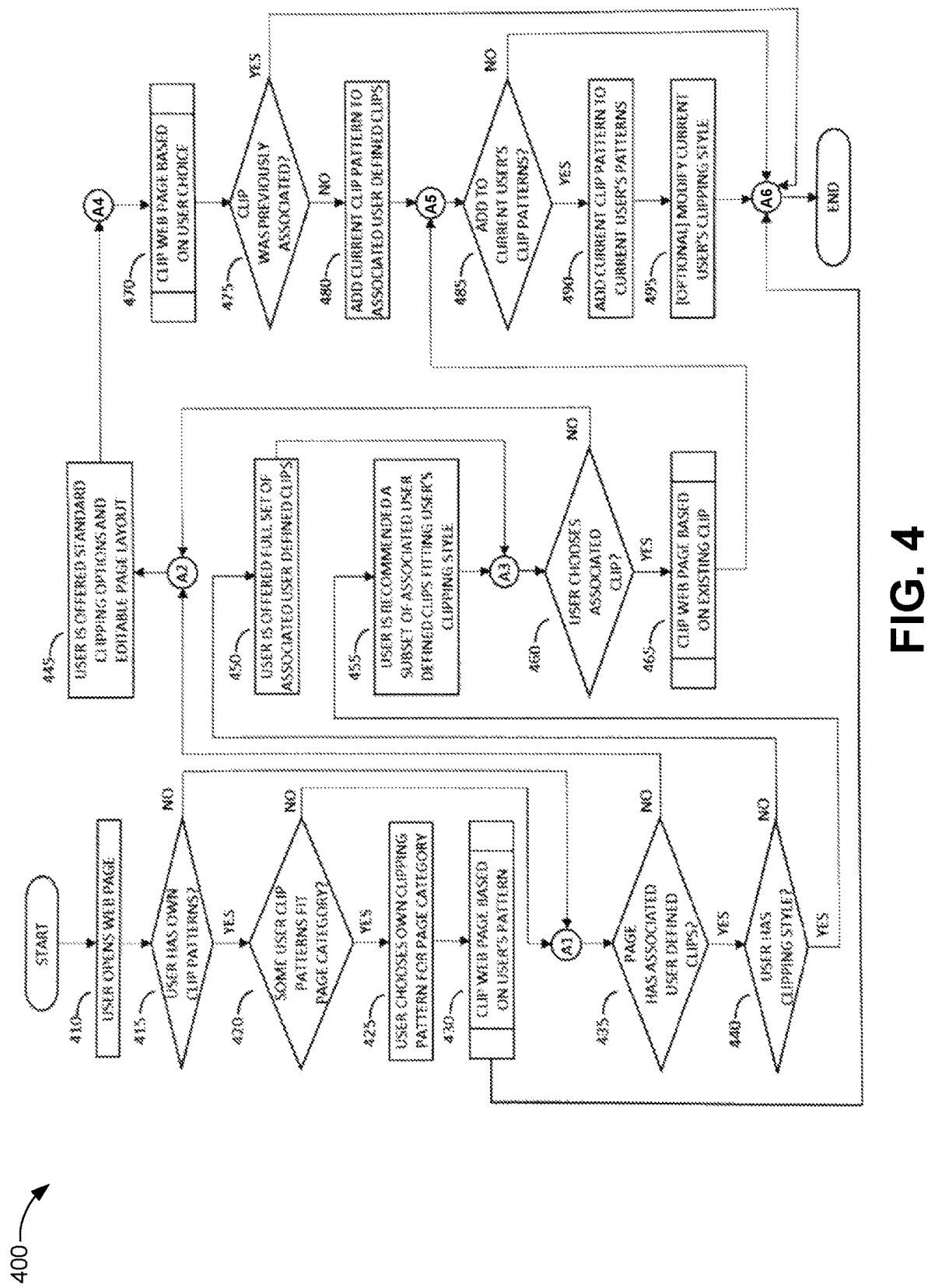
FIG. 4 is a flow diagram for an example content clipping method in accordance with some implementations.
Figure 5A:
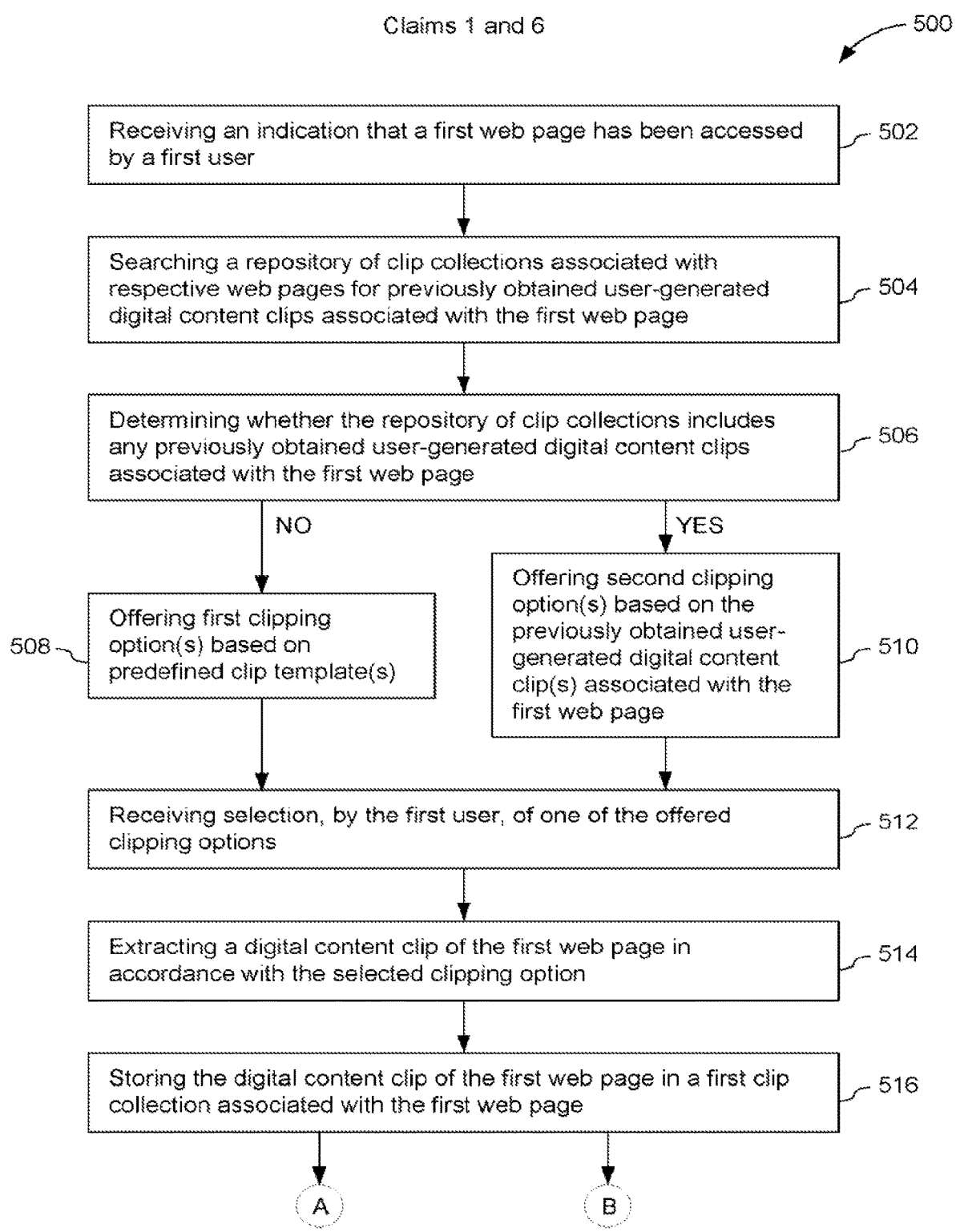
FIGS. 5A-5D are flow diagrams for an example content clipping method in accordance with some implementations.
Figure 5B:
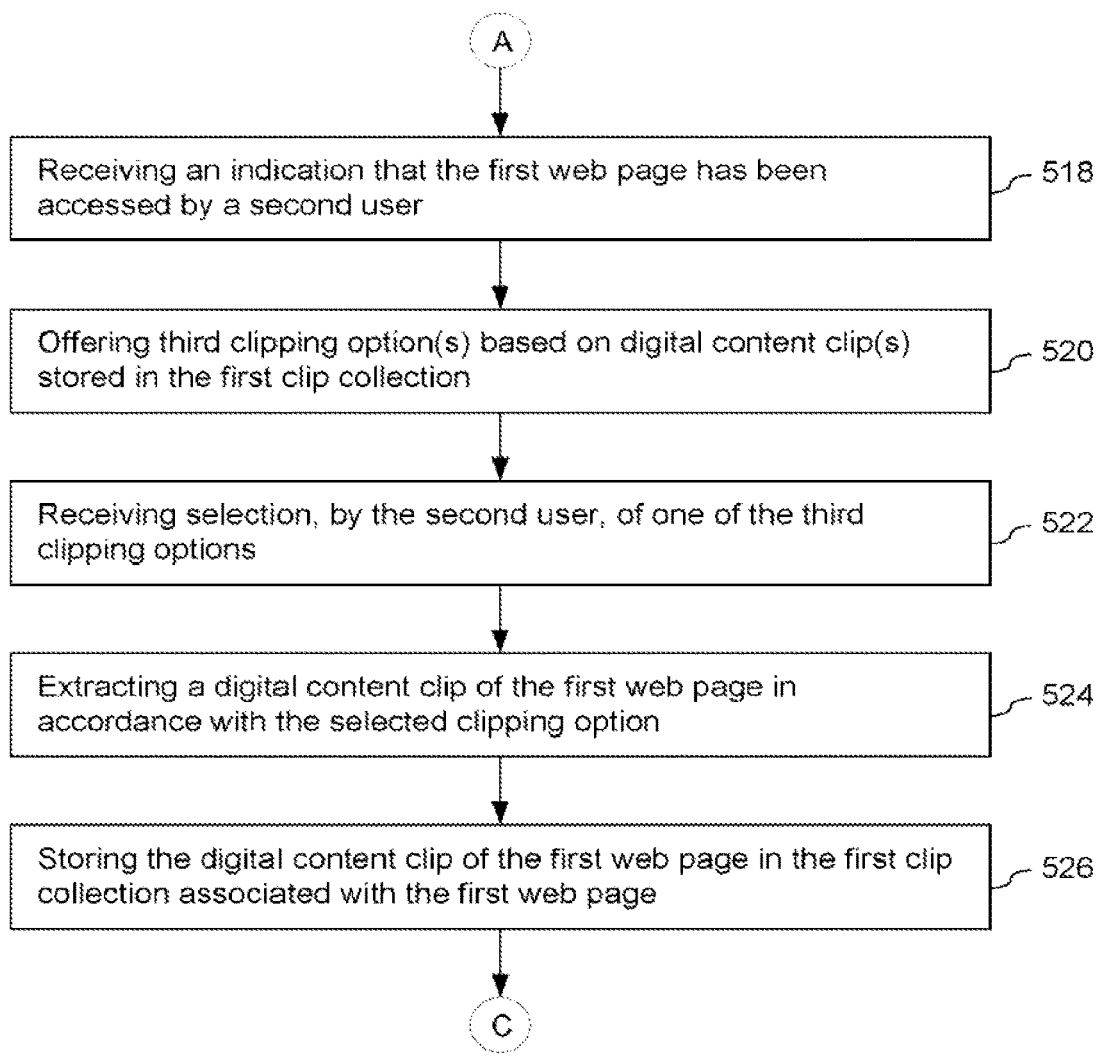
Figure 5C:
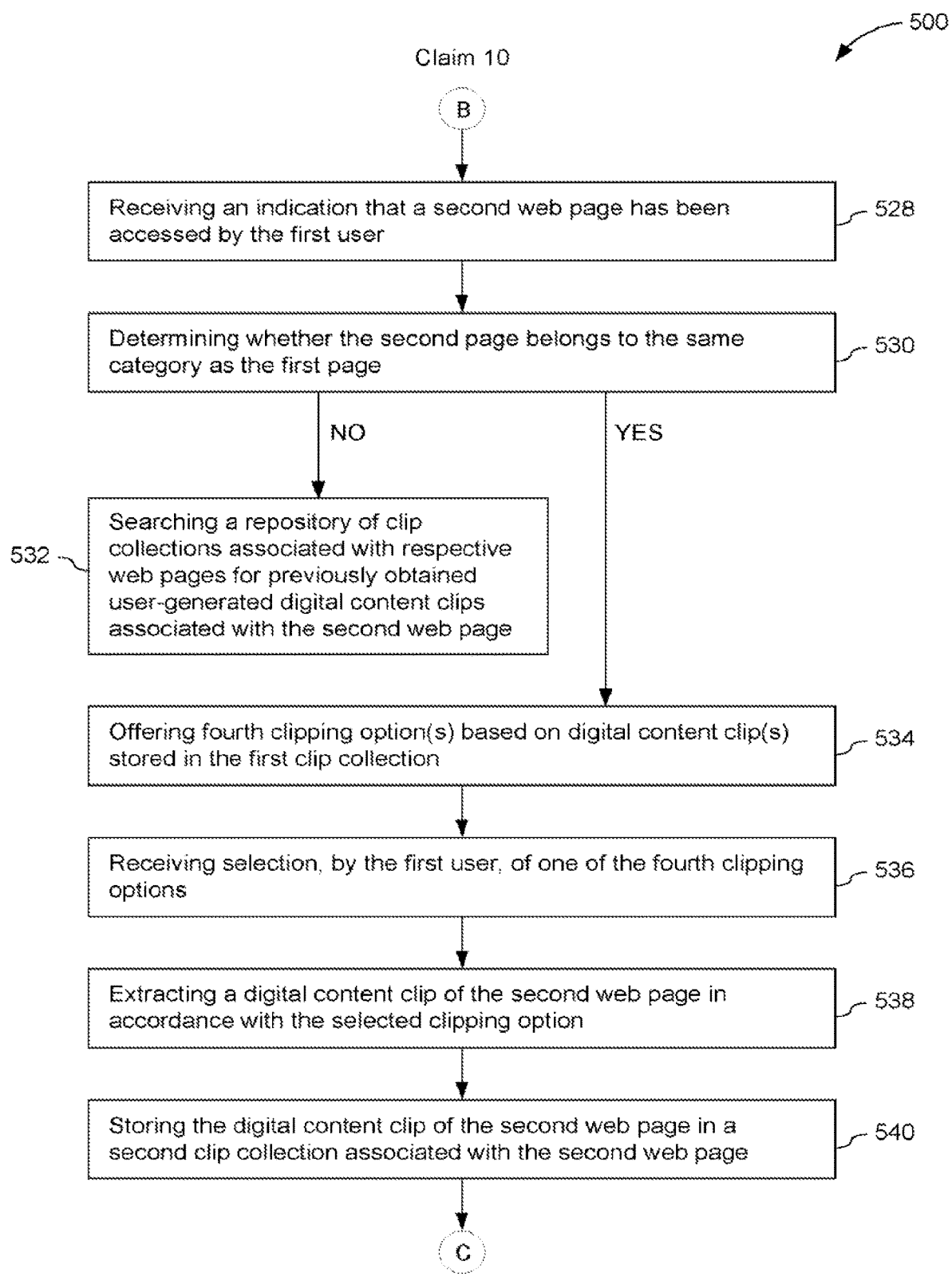
Figure 5D:
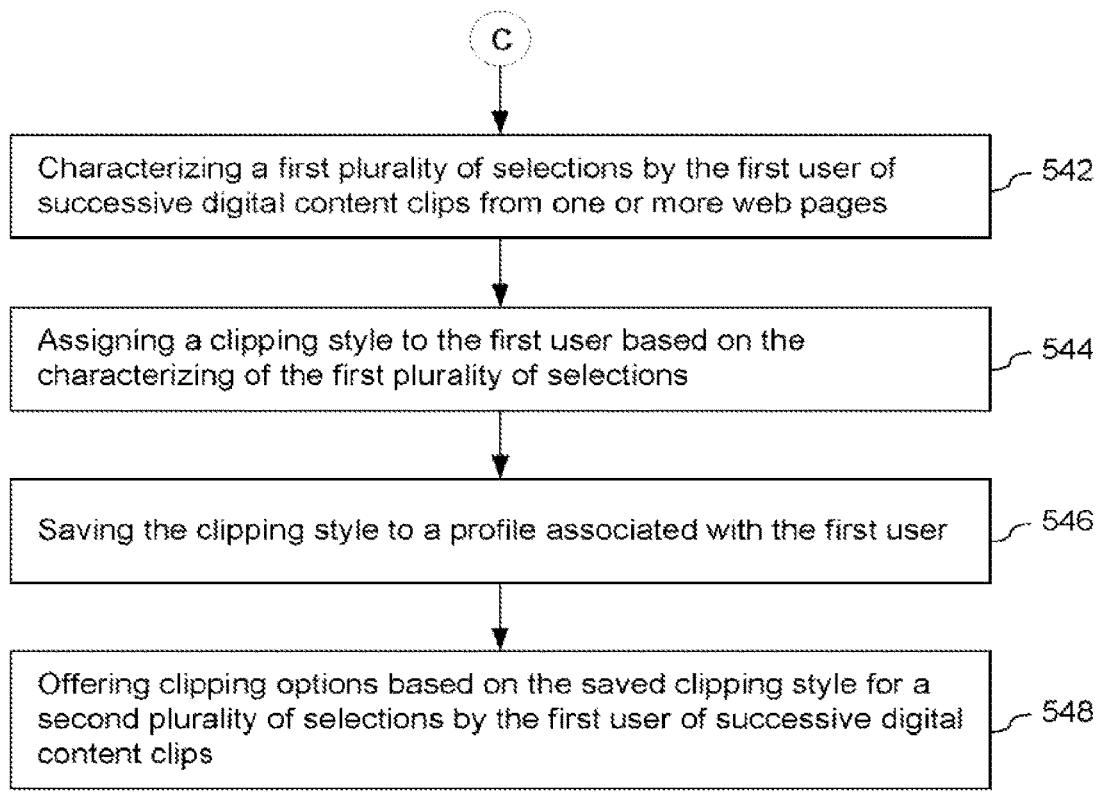

FIG. 4 is a flow diagram for an example content clipping method 400 in accordance with some implementations. In accordance with the content clipping method 400, a user of a browser application opens (410) a new web page 112. A content clipping application 104 determines (415) whether the user already has a preferred, stored, or preselected clip pattern, and if so, determines (420) whether at least one of the user's clip patterns fit the category of the web page. If so, then the user chooses (425) a clipping pattern for the page category to use for the page, and the clipping application clips (430) the web page based on the user's selected clipping pattern. If the user does not already have a clipping pattern, or if the user's clipping patterns do not fit the category of the web page, the clipping application determines (435) whether the page has any associated user defined clips (e.g., 110) in a repository 106 obtained from previous users.

If the page does not have any associated user defined clips, the clipping application offers (445) the user standard clipping options (e.g., 108) and editable page layouts (e.g., 206). The user selects a clipping option, and the clipping application clips (470) the web page based on the user's selection. The clipping application determines (475) whether the selected clip had been previously associated with the web page. If the selected clip had been previously associated with the web page, the method is complete. However, if the selected clip had not been previously associated with the web page, the clipping application adds (480) the clip pattern to the repository 106 of user defined clips associated with the web page. The clipping application determines (485) whether to add the selected clip pattern to the user's clip patterns. In some implementations, the clipping application prompts the user to decide whether to add the clip, and if the user decides to add the clip, the application adds (490) the clip to the user's saved clips. Alternatively, the clipping application automatically adds (490) the clip if it is not already added to the user's saved clips. Optionally, the clipping application modifies (495) the user's clipping style based on the added clip.

If the page does have an associated user defined clip, the clipping application determines (440) whether the user has a preferred, preselected, or preassigned clipping style. If the user does not have a clipping style, the clipping application offers (450) the user a full set of associated user defined clips. If the user does have a clipping style, the clipping application recommends (455) to the user a subset of associated user defined clips that fit the user's clipping style. The clipping application determines (460) whether the user chooses or does not choose one of the offered or recommended associated clips. If the user does not choose one of the offered or recommended associated clips, the clipping application offers (445) the user standard clipping options, and the method proceeds as described above. If the user does choose one of the offered or recommended associated clips, the clipping application clips (465) the web page based on the selected clip. The clipping application determines (485) whether to add the selected clip to the user's clip patterns, and proceeds as described above.

FIGS. 5A-5D depict a flow chart of another example content clipping method 500 in accordance with some implementations. The method 500 is implemented in a computer with a processor and memory including one or more programs executable by the processor. A clipping application, either local to a user's computer (e.g., through a browser extension) or remotely located (e.g., on a server) receives (522) an indication that a first web page (e.g., 112) has been accessed by a first user. In some implementations, the indication includes information identifying the web page, such as the web page's address. The clipping application searches (504) a repository of clip collections (e.g., 106) associated with respective web pages for previously obtained user-generated digital content clips associated with the first web page. The clipping application determines (506) whether the repository of clip collections includes any previously obtained user-generated digital content clips associated with the first web page. If the repository does not include any previously obtained user-generated clips associated with the first web page, the clipping application offers (508) one or more first clipping options based on predefined clip templates (e.g., 108). If the repository does include a previously obtained user-generated clip associated with the first web page, the clipping application offers (510) one or more second clipping options based on the previously obtained user-generated digital content clip(s) associated with the first web page. In some implementations, if the repository includes a previously obtained clip, the clipping application offers a combination of predefined clip(s) and previously obtained clip(s) (e.g., clips in menu 204). The clipping application receives (512) selection, by the first user, of one of the offered clipping options, extracts (514) a clip in accordance with the selected clipping option, and stores the clip locally to the user's computing system (e.g., in a local clip library 638) for the user's own benefit and future retrieval. In some implementations, the clip is stored in a remote server system (e.g., cloud storage), but is only made available to the user (e.g., stored in a private library accessible only to the user). In addition to storing the captured clip locally, the clipping application also stores (516) the clip in a first clipping collection (e.g., 106-1, FIG. 7) associated with the first web page in a remote server for access by other users. As described above, in some implementations, when the clip is stored in a repository or clipping collection for other users, some content may be removed (e.g., user remarks). In some implementations, only the clip layout is stored, or an indication of which option was selected, so that subsequent users have more efficient access to the first user's preferred layout or selection, while avoiding possible privacy issues regarding the first user's added content (e.g., private remarks).

In some implementations, in the event that the clipping application receives (518) an indication that the first web page has been accessed by a second user, the clipping application offers (520) third clipping options based on one or more clips stored in the first clip collection, such as the clip stored in step 516. Upon receiving (522) selection, by the second user, of one of the third clipping options, the clipping application extracts (524) a clip of the first web page in accordance with the selected clipping option, and stores (526) the clip in the first clip collection (e.g., 106-1). In this scenario, the first clip collection would now have two user-generated clips, and in some implementations, the clipping application offers both of the user-generated clips to a subsequent visitor of the first web page. In some implementations, the captured clip or certain components of the captured clip are stored locally, remotely, or a combination thereof as described with reference to steps 514 and 516 above.

In some implementations, in the event that the clipping application receives (528) an indication that a second web page, different from the first, has been accessed by the first user, the clipping application determines (530) whether the second page belongs to the same category as the first page (e.g., categories 306). If the second page does not belong to the same category as the first page, the clipping application searches the repository for user-generated clips associated with the second page, and proceeds in a similar fashion as that described with respect to steps 506-516, but from the perspective of the second web page. If the second page does belong to the same category as the first page, the clipping application offers (534) one or more fourth clipping options based on the clips stored in the first clip collection associated with the first web page (e.g., if the second web page is a food page, and the first web page is also a food page, look in the first web page's clip collection for clips). In some implementations, the clipping application first searches the repository for a clip collection associated with the second web page (e.g., 106-2), and only uses clips in the first clip collection if there are no available clips associated with the second web page. In some implementations, the clipping application offers a combination of clips from the clip collections for both the first and second web pages. Upon receiving (536) a selection, by the first user, of one of the offered clips, the clipping application extracts (538) a clip in accordance with the selected clipping option, and stores (540) the selected clip in the second clip collection (e.g., 106-2) associated with the second web page. In some implementations, the clip or certain components of the clip are stored locally, remotely, or a combination thereof as described with reference to steps 514 and 516 above.

In some implementations, the clipping application tracks the first user's clipping selections, and characterizes (542) a first plurality of the tracked clipping selections of successive clips from one or more web pages, and assigns (544) a clipping style to the first user based on the characterizing of the first plurality of selections. In some implementations, the clipping application saves (546) the clipping style to a profile associated with the first user (e.g., 640) and offers (548) clipping options for one or more subsequent clipping selections based on the saved clipping style. In some implementations, the user's clipping style is continuously updated as more clipping options are selected and tracked. In some implementations, the clipping application saves a plurality of clipping styles for the user based on respective web page categories.

It should be understood that the particular order in which the operations in FIGS. 4 and 5 have been described are merely exemplary and are not intended to indicate that the described order is the only order in which the operations could be performed. One of ordinary skill in the art would recognize various ways to reorder the operations described herein. Additionally, it should be noted that details of processes described with respect to method 400 (e.g., FIG. 4) are also applicable in an analogous manner to method 500 described above with respect to FIG. 5, and that details of processes described with respect to method 500 (e.g., FIG. 5) are also applicable in an analogous manner to method 400 described above with respect to FIG. 4.

Figure 6:
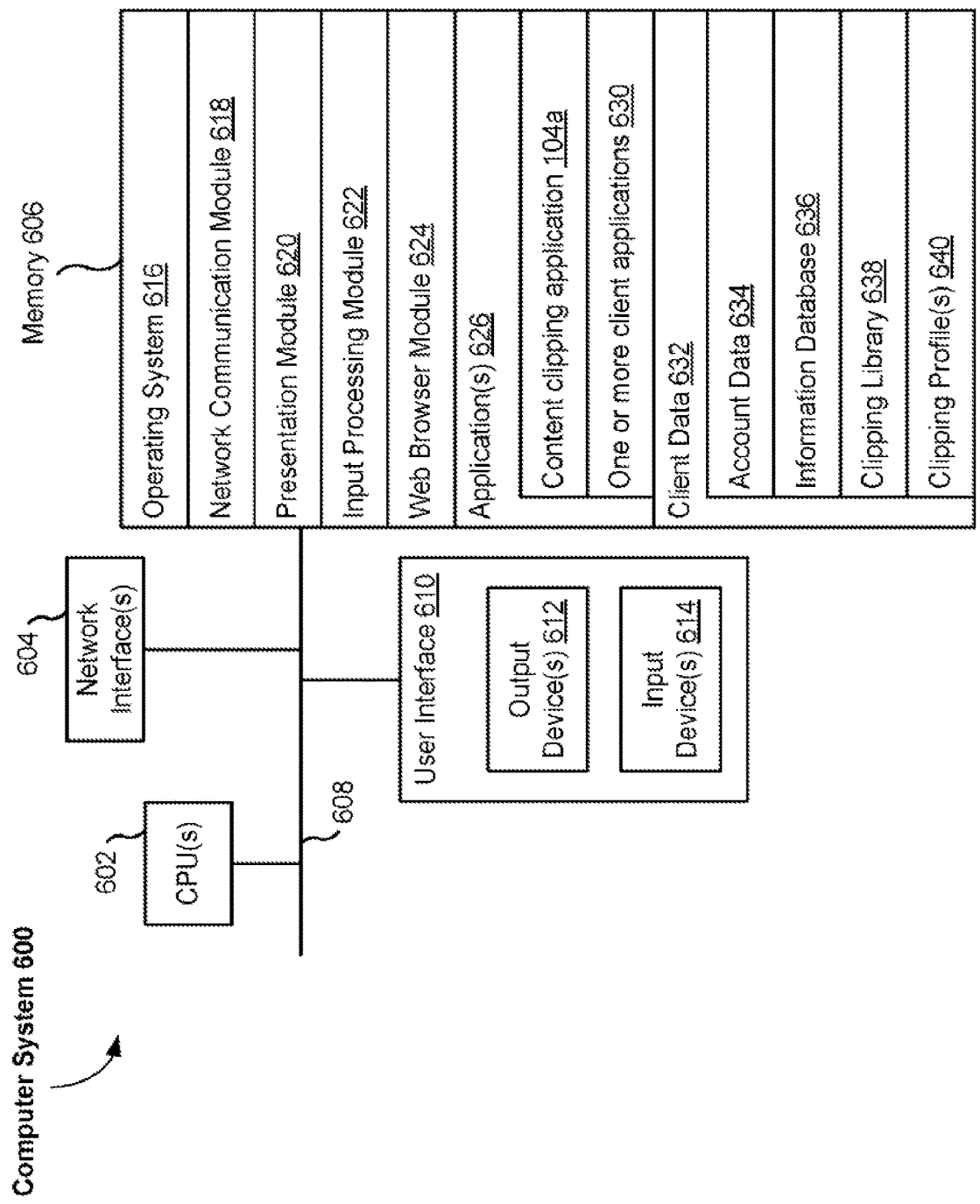
FIG. 6 is a block diagram of a computer system that manages content clipping in accordance with some implementations.

FIG. 6 is a block diagram of a computer system 600 that manages content clipping in accordance with some implementations. The computer system 600, typically, includes one or more processing units (CPUs) 602, one or more network interfaces 604, memory 606, and one or more communication buses 608 for interconnecting these components (sometimes called a chipset). The computer system 600 also includes a user interface 610. User interface 610 includes one or more output devices 612 that enable presentation of structured or unstructured information. User interface 610 also includes one or more input devices 614, including user interface components that facilitate user input such as a keyboard, a mouse, a voice-command input unit or microphone, a touch screen display, a touch-sensitive input pad, a camera, or other input buttons or controls. Furthermore, in some implementations, the computer system 600 uses a microphone and voice recognition or a camera and gesture recognition to supplement or replace the keyboard. Optionally, the computer system 600 includes one or more cameras, scanners, or photo sensor units for capturing images. Optionally, the computer system 600 includes a microphone for recording an audio clip.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating system 616 including procedures for handling various basic system services and for performing hardware dependent tasks;
- Network communication module 618 for connecting the computer system 600 to other computer systems (e.g., a server system 700, FIG. 7) via one or more network interfaces 604 (wired or wireless);
- Presentation module 620 for enabling presentation of information (e.g., a graphical user interface for presenting application(s) 626, widgets, websites and web pages thereof, and/or games, audio and/or video content, text, etc.) at the computer system 600 via one or more output devices 612 (e.g., displays, speakers, etc.) associated with user interface 610;
- Input processing module 622 for detecting one or more user inputs or interactions from one of the one or more input devices 614 (e.g., a keyboard) and interpreting the detected input or interaction in conjunction with one or more applications 626;
- Web browser module 624 for navigating, requesting (e.g., via HTTP), and displaying websites and web pages thereof in a browser application 102;
- One or more applications 626 for execution by the computer system 600, including, but not limited to, a component 104a of content clipping application 104 and one or more other client applications 630;
- Client data 632 storing data associated with the one or more applications 626, including, but is not limited to:
  - Account data 634 storing information related with accounts of the user or the content clipping application 104;
  - Information database 636 for selectively storing a navigation/browsing history 120 of the browser application 102, a content collection 116 of the content clipping application 104, categories associated with content items of the content clipping application 104, and the like;
  - Clip library 638 for storing the user's personalized web clips (e.g., web clips including content of actual web pages visited, user remarks, personalized layouts, and other content added by the user for the user's own benefit and later retrieval)
  - Clipping profile 640 storing one or more clipping styles associated with the user and/or one or more web page categories accessed by the user.

In some implementations, the content clipping application 104 is configured to at least partially implement the methods 400 and 500 for capturing digital content clips of web pages accessed by the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

A person skilled in the art would recognize that particular embodiments of the computer system 600 may include more or fewer components than those shown. One or more modules may be divided into sub-modules, and/or one or more functions may be provided by different modules than those shown. In some embodiments, an individual one of computer system 600 implements or performs one or more methods described herein with respect to FIGS. 4 and 5. In some embodiments, a plurality of machines (e.g., a local computer and one or more remote servers) together implement or perform one or more methods described with respect to FIGS. 4 and 5. For example, a first computer system (e.g., a server) obtains a browsing history including pages displayed in current open tabs from a second computer system (e.g., a local computer) via one or more wired or wireless communication networks. The first computer system categorizes digital content obtained from the browsing history, generates an application window or tab, and enables display of the application window or tab on the second computer system for its user to select a snippet or a fragment of a web page corresponding to a selected snippet in a clipping operation. The selected snippet or fragment of the web page are inserted as a content item into a content clipping application 104 executed on the second computer system. More details on the content clipping application 104 are discussed above with reference to FIGS. 1-5.

Figure 7:
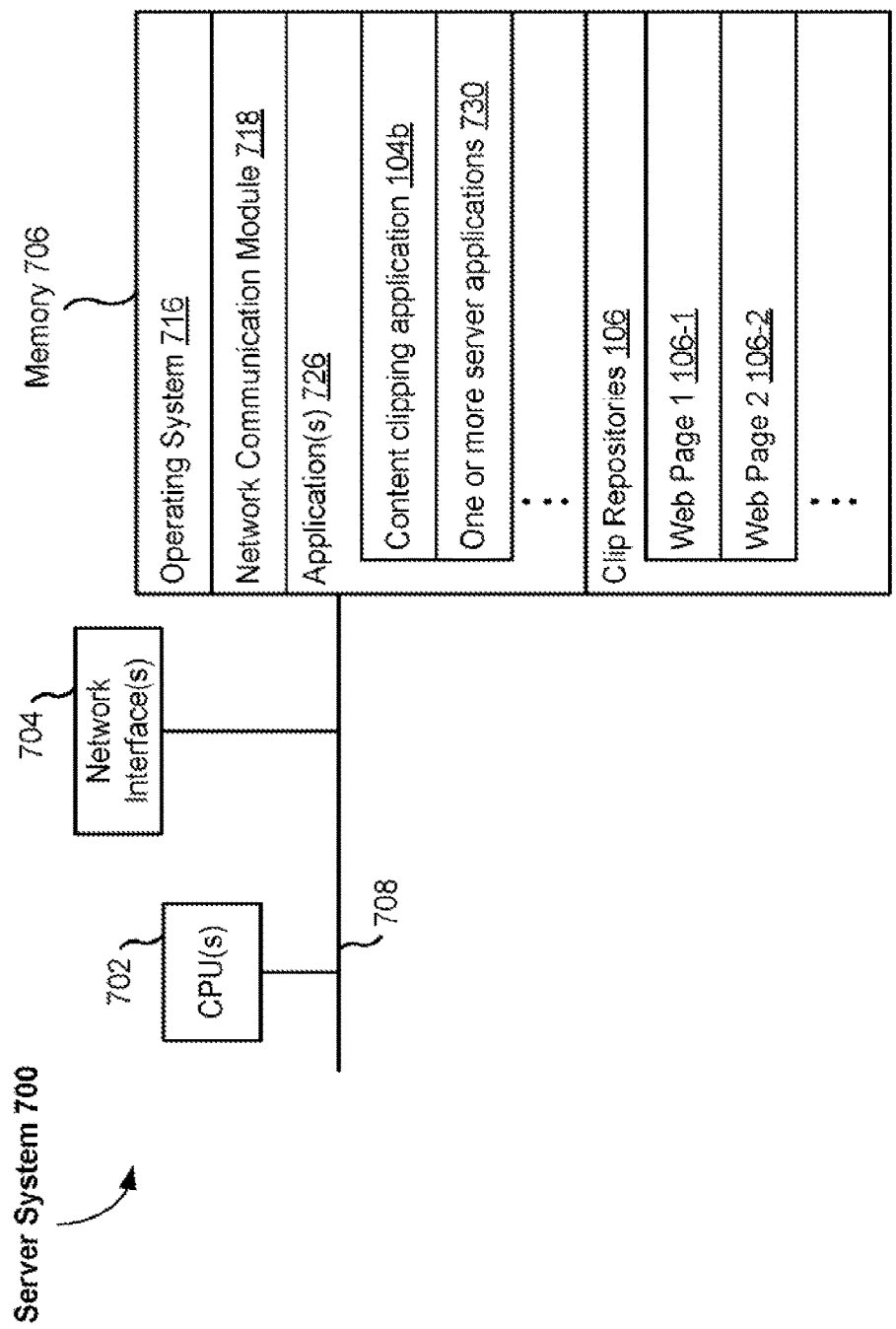
FIG. 7 is a block diagram of a server system that manages content clipping in accordance with some implementations.

FIG. 7 is a block diagram of a server system 700 that manages content clipping in accordance with some implementations. The server system 700, typically, includes one or more processing units (CPUs) 702, one or more network interfaces 704, memory 706, and one or more communication buses 708 for interconnecting these components (sometimes called a chipset).

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- Operating system 716 including procedures for handling various basic system services and for performing hardware dependent tasks;
- Network communication module 718 for connecting the server system 700 to other computer systems (e.g., a computer system 600, FIG. 6) via one or more network interfaces 704 (wired or wireless);
- One or more applications 726 for execution by the server system 700, including, but not limited to, a component 104b of content clipping application 104 and one or more other server applications 730; and
- Clip repositories 106 storing user-generated digital content clips associated with particular web pages (e.g., 106-1 for storing clips associated with web page 1, 106-2 for storing clips associated with web page 2, and so forth). Optionally, each web page's repository also stores category information (e.g., page category 306) specific to the web page.

In some implementations, the content clipping application 104 is configured to at least partially implement the methods 400 and 500 for capturing digital content clips of web pages accessed by the user.

The implementations described herein provide benefits to users of web clipping applications in the form of more efficient and streamlined web clipping processes. For example, by providing a local web clipping application with access to web clips that have been edited or customized by other (e.g., remote) web clipping applications (e.g., edited or customized by other users), the local application can provide more relevant options to the local user, enabling more efficient capturing of web clips. Stated another way, by leveraging other users' customized web clips, a local user can more efficiently curate his or her own collection of web clips. The local user does not have to reinvent the wheel and customize a new web clip for every new web page that the user visits if the user's web clipping application has access to repositories of other users' web clips, especially if those web clips from other others have been found to be relevant to the web page that the local user currently desires to clip. Moreover, by tracking clipping activity from a user and creating clipping profiles based on the user's clipping activity, the various embodiments described herein provide additional efficiencies in the web clipping process, not only for the user being tracked, but for other users subsequently visiting web pages for which previous users have clipped. For example, if a user is only willing to spend a certain amount of time to customize a useful web clip for a particular web page, the more streamlined web clipping implementations described herein would make it more likely that the user would not only capture more web clips, but also more productively spend the allotted time for web clipping by customizing the content and/or layout of the various clips, thereby providing more useful and relevant clipping options for other users who subsequently access the particular web page.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

A person skilled in the art would recognize that particular embodiments of the server system 700 may include more or fewer components than those shown. One or more modules may be divided into sub-modules, and/or one or more functions may be provided by different modules than those shown. In some embodiments, an individual one of server system 700 implements or performs one or more methods described herein with respect to FIGS. 4 and 5. In some embodiments, a plurality of machines (e.g., a local computer 600 and one or more remote servers 700) together implement or perform one or more methods described with respect to FIGS. 4 and 5.

Reference is made herein in detail to implementations, examples of which are illustrated in the accompanying drawings. In the detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, mechanical structures, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first answer term could be termed a second answer term, and, similarly, a second answer term could be termed a first answer term, without departing from the scope of the various described implementations. The first answer term and the second answer term are both answer terms, but they are not the same answer terms.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, components, structures and/or groups, but do not preclude the presence or addition of one or more other features, integers, steps, operations, elements, components, structures, and/or groups thereof.

It is important to note that throughout this disclosure, "clips," "digital content clips," "clip layouts," and "clip templates" are referred to interchangeably, and in general, each term can be substituted with another without changing the meaning or scope of the term.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is noted that the computer system described herein is exemplary and is not intended to be limiting. For example, any components and modules described herein are exemplary and are not intended to be limiting. For brevity, features or characters described in association with some implementations may not necessarily be repeated or reiterated when describing other implementations. Even though it may not be explicitly described therein, a feature or characteristic described in association with some implementations may be used by other implementations.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for digital content clipping, comprising:
   at a computer with a processor and memory including one or programs executable by the processor to perform:
   receiving an indication that a first web page has been accessed by a first user; and
   while accessing the first web page:
      determining whether the first web page has any user-defined content clip in a repository of digital content; and
      in accordance with a determination that the first web page has one or more user-defined content clips in the repository:
         in response to identifying of one of the one or more user-defined content clips of the first web page, extracting a first digital content clip of the first web page based on a clipping attribute of the identified one of the one or more user-defined content clips; and
         in response to no identifying of any of the one or more user-defined content clips of the first web page, identifying a standard clipping option, and extracting a second digital content clip of the first web page based on the identified standard clipping option.

2. The method of claim 1, further comprising:
   in accordance with a determination that the first web page does not have any user-defined content clip in the repository, selecting the standard clipping option, and extracting the first digital content clip of the first web page based on the standard clipping option.

3. The method of claim 1, further comprising:
   identifying the one of the one or more user-defined content clips of the first web page based on a clipping style of the first user.

4. The method of claim 3, further comprising:
   tracking, by the first user, a first plurality of selections of successive digital content clips from one or more web pages;
   characterizing the first plurality of selections;
   assigning a clipping style to the first user based on the characterizing of the first plurality of selections; and
   saving the clipping style to a profile associated with the first user.

5. The method of claim 3, identifying of one of the one or more user-defined content clips of the first web page further comprising:
   in accordance with the clipping style of the first user, causing to be displayed a subset of the one or more user-defined content clips of the first web page; and
   receiving a user selection of the one of the one or more user-defined content clips.

6. The method of claim 1, identifying of one of the one or more user-defined content clips of the first web page further comprising:
determining that the first user does not have any preferred, preselected, and preassigned clipping style;
causing to be displayed all of the one or more user-defined content clips of the first web page; and
receiving a user selection of the one of the one or more user-defined content clips.

7. The method of claim 1, further comprising:
determining whether at least one clip pattern fits a category of the first web page, wherein whether the first web page has any user-defined content clip in the repository of digital content is determined in accordance with a determination that no clip pattern is available or fits the category of the first web page.

8. The method of claim 7, further comprising:
in accordance with a determination that at least one clip pattern fits the category of the first web page, receiving a user input selecting a first clip pattern from the at least one clip pattern, and extracting a first digital content clip of the first web page based ons the first clip pattern.

9. The method of claim 8, wherein the first clipping pattern includes a first clipping template defined based on a clipping category corresponding to the category of the first web page.

10. The method of claim 1, further comprising:
adding the first digital content clip of the first web page to one or clip patterns of the first user.

11. A computer, comprising:
a processor; and
memory including one or programs executable by the processor to perform:
receiving an indication that a first web page has been accessed by a first user; and
while accessing the first web page:
determining whether the first web page has any user-defined content clip in a repository of digital content; and
in accordance with a determination that the first web page has one or more user-defined content clips in the repository:
in response to identifying of one of the one or more user-defined content clips of the first web page, extracting a first digital content clip of the first web page based on a clipping attribute of the identified one of the one or more user-defined content clips; and
in response to no identifying of any of the one or more user-defined content clips of the first web page, identifying a standard clipping option, and extracting a second digital content clip of the first web page based on the identified standard clipping option.

12. The computer of claim 11, wherein the standard clipping option includes one or more of: a full reproduction of the first web page, a summary snippet of the first web page, a bookmark of the first web page, a web address of the first web page, a fragment of content extracted from the first web page, content extracted from the first web page in a format for easy reading, a user selection from the first web page, or a screenshot of the first web page.

13. The computer of claim 11, wherein the identified one of the one or more user-defined content clips is created using a custom clipping option.

14. The computer of claim 13, wherein the custom clipping option includes one or more of: an editable page layout, or a template with an uncompleted parameter; and
wherein the first user is prompted to edit the page layout or fill in the uncompleted parameter, respectively, before storing the first digital content clip.

15. The computer of claim 11, the one or more programs further comprising instructions for storing the first digital content clip, the storing including one or more of:
storing web page content associated with the first digital content clip;
storing one or more of a layout associated with the first digital content clip; and
storing a category of the first digital content clip.

16. A non-transitory computer readable storage medium storing one or more programs configured for execution by a computer, the one or more programs comprising instructions for:
receiving an indication that a first web page has been accessed by a first user; and
while accessing the first web page:
determining whether the first web page has any user-defined content clip in a repository of digital content; and
in accordance with a determination that the first web page has one or more user-defined content clips in the repository:
in response to identifying of one of the one or more user-defined content clips of the first web page, extracting a first digital content clip of the first web page based on a clipping attribute of the identified one of the one or more user-defined content clips; and
in response to no identifying of any of the one or more user-defined content clips of the first web page, identifying a standard clipping option, and extracting a second digital content clip of the first web page based on the identified standard clipping option.

17. The non-transitory computer readable storage medium of claim 16, the one or more programs further comprising instructions for:
storing the first digital content clip and a clip template of the first digital content clip of the first web page in a first clip collection of the repository associated with the first web page.

18. The non-transitory computer readable storage medium of claim 16, wherein the one or more user-defined content clips were obtained from one or more users other than the first user.

19. The non-transitory computer readable storage medium of claim 16, wherein the repository is a crowd-sourced repository that can be accessed by the first user and one or more users other than the first user.

20. The non-transitory computer readable storage medium of claim 16, identifying a standard clipping option further comprising:
causing to be displayed a plurality of standard clipping options; and
receiving a user selection of the identified standard clipping option.

* * * * *